United States Patent
Kay et al.

(10) Patent No.: US 9,777,641 B2
(45) Date of Patent: Oct. 3, 2017

(54) SYSTEM FOR TURBOMACHINE VANE CONTROL

(71) Applicant: General Electric Company, Schenectady, NY (US)

(72) Inventors: Cyron Frank Kay, Simpsonville, SC (US); John Carver Maters, Liberty, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 817 days.

(21) Appl. No.: 13/721,000

(22) Filed: Dec. 19, 2012

(65) Prior Publication Data
US 2014/0169948 A1    Jun. 19, 2014

(51) Int. Cl.
*F01D 17/16* (2006.01)
*F02C 9/20* (2006.01)
*F16D 125/58* (2012.01)

(52) U.S. Cl.
CPC .............. *F02C 9/20* (2013.01); *F01D 17/162* (2013.01); *F16D 2125/58* (2013.01)

(58) Field of Classification Search
CPC ...... F01D 17/162; F02C 9/20; F16D 2125/18; F16D 2125/20; F16D 2125/58; F16D 2125/582; F16D 2125/585; F16D 2125/66; F16D 2125/70
USPC ........................................................ 415/150
See application file for complete search history.

(56) References Cited

U.S. PATENT DOCUMENTS

| | | | | |
|---|---|---|---|---|
| 3,779,665 A * | 12/1973 | Tatem et al. | ........... | 415/123 |
| 4,874,287 A * | 10/1989 | Grieb | ........... | 415/149.2 |
| 5,044,879 A * | 9/1991 | Farrar | ........... | 415/150 |
| 7,096,657 B2 | 8/2006 | Mahoney et al. | | |
| 8,882,438 B2 * | 11/2014 | Asti | ........... | F01D 17/165 415/1 |
| 2009/0143644 A1 * | 6/2009 | Stiller | ........... | G05B 11/01 600/118 |
| 2009/0297334 A1 * | 12/2009 | Norris | ........... | F01D 17/08 415/49 |
| 2010/0005808 A1 * | 1/2010 | Nanataki | ........... | F02C 9/20 60/773 |
| 2011/0190950 A1 | 8/2011 | Colotte et al. | | |
| 2011/0305556 A1 * | 12/2011 | Asti | ........... | F01D 17/165 415/1 |
| 2014/0169948 A1 * | 6/2014 | Kay et al. | ........... | 415/148 |

* cited by examiner

*Primary Examiner* — Christopher Verdier
*Assistant Examiner* — Christopher R Legendre
(74) *Attorney, Agent, or Firm* — Fletcher Yoder, P.C.

(57) ABSTRACT

A gas turbine system includes a compressor. The compressor has a plurality of inlet guide vanes disposed at an inlet of the compressor. Furthermore, the compressor may have at least one unison ring coupled to a plurality of variable stator vanes disposed between the inlet and an outlet of the compressor. The gas turbine system includes a first actuator that may adjust a first pitch of the plurality of inlet guide vanes and a second actuator that may adjust a second pitch of the plurality of variable stator vanes. A first electric motor may drive the first actuator, while a second electric motor may drive the second actuator.

19 Claims, 4 Drawing Sheets

SYSTEM FOR TURBOMACHINE VANE CONTROL

BACKGROUND OF THE INVENTION

The subject matter disclosed herein relates to gas turbines, and more specifically, to systems for controlling operation of the gas turbine.

Gas turbine systems generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. Unfortunately, the flow and pressure of the fluids into the compressor or turbine may be unstable or unsuitable for particular operating modes of the gas turbine system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a gas turbine system includes a compressor. The compressor has a plurality of inlet guide vanes disposed at an inlet of the compressor. Furthermore, the compressor may have at least one unison ring coupled to a plurality of variable stator vanes disposed between the inlet and an outlet of the compressor. The gas turbine system includes a first actuator that may adjust a first pitch of the plurality of inlet guide vanes and a second actuator that may adjust a second pitch of the plurality of variable stator vanes. A first electric motor may drive the first actuator, while a second electric motor may drive the second actuator.

In a second embodiment, a gas turbine system includes a compressor having a plurality of vanes disposed circumferentially about an axis of the compressor. First and second actuators may adjust a pitch of the plurality of vanes. A first electric motor may drive the first actuator, and a second electric motor may drive the second actuator. Furthermore, a first motor controller may execute first instructions to control the first electric motor, and a second motor controller may execute second instructions to control the second electric motor.

In a third embodiment, an actuator system for a compressor includes an electric motor, and an actuator that may be driven by the electric motor. A controller includes memory and a processor that may execute instructions to control the electric motor. The actuator includes a housing and a shaft disposed within a passage of the housing. The passage defines a first physical stop that may constrain axial movement of the shaft. At least one frusto-conical washer is disposed around the shaft. A spring is coupled to a spring support defining a second physical stop that may constrain axial movement of the shaft when the at least one frusto-conical washer contacts the spring support.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
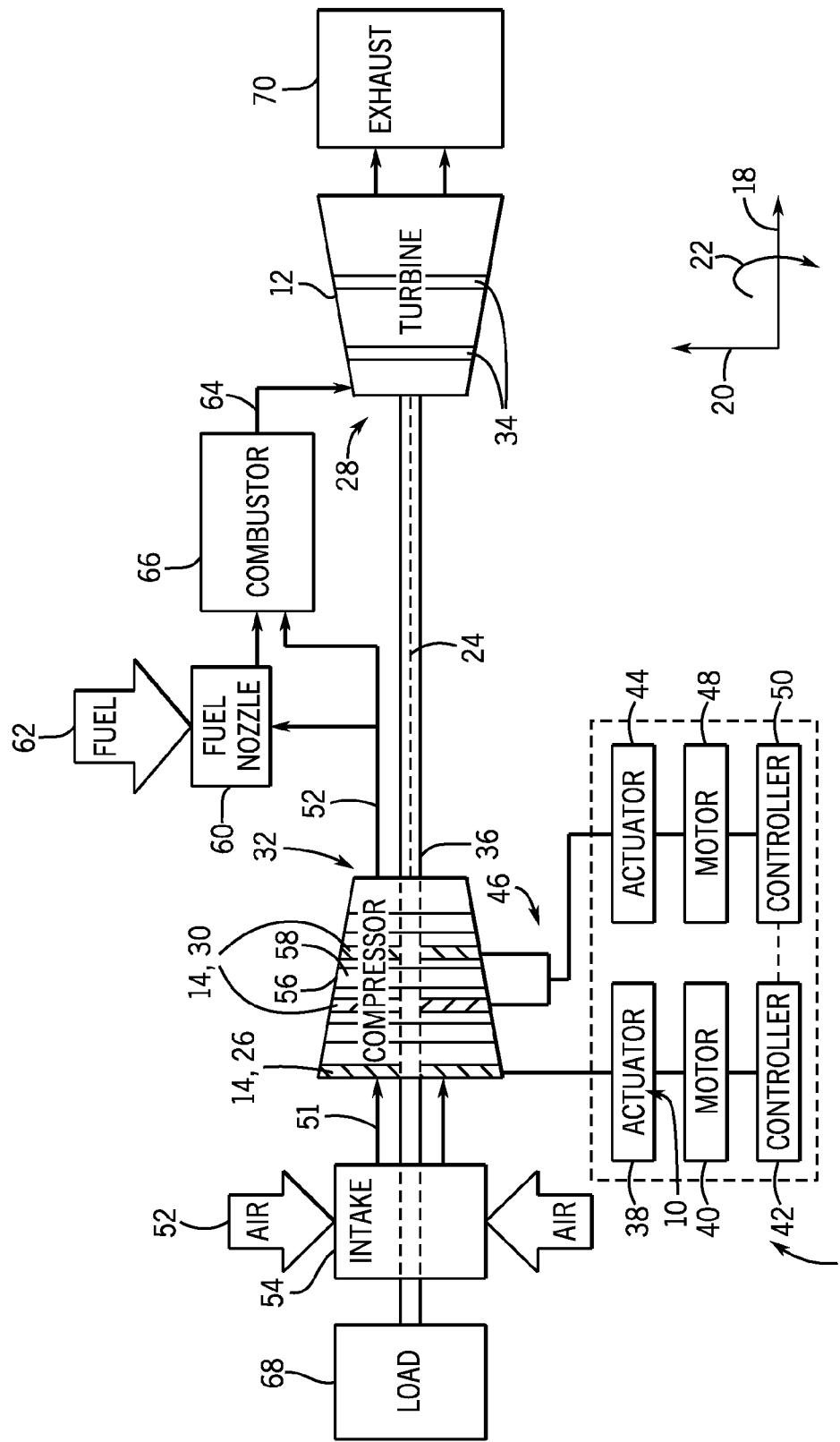
FIG. 1 is a schematic diagram of an embodiment of a gas turbine system having a compressor equipped with vanes and an actuation system with one or more electric actuators to control the vanes.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed toward systems to control turbomachine vanes within gas turbine systems. In particular, a compressor includes one or more compressor stages, each defined by a set of rotor blades (e.g., blades rotating about the compressor axis) and a set of stator vanes (e.g., stationary vanes). For example, the stator vanes may include inlet guide vanes (IGVs) positioned at an inlet of the compressor, variable stator vanes (VSVs) positioned between the inlet and an outlet of the compressor, or both. During or before operation of the compressor, it may be desirable to adjust a pitch (e.g., angle relative to the compressor axis) of the stator vanes in order to control certain operating conditions of the compressor (e.g., flow rate or pressure drop). It should be noted that the desired pitch of the compressor vanes may vary depending on an operating mode of the gas turbine (e.g., start-up, transient, steady-state, partial-load, or full-load), as will be discussed in detail below. To this end, electric actuators are coupled to the stator vanes in order to adjust the pitch of the stator vanes. The electric actuators may be driven by electric motors, which, in turn, are controlled by motor controllers. Advantageously, electric actuators may be relatively accurate compared to certain types of actuators (e.g., pneumatic actuators or hydraulic actuators).

In certain embodiments, each set of stator vanes may be adjusted by one or more electric actuators. That is, a single set of stator vanes defined by an axial position may be coupled to 1, 2, 3, 4, or more electric actuators. In general, increasing the number of electric actuators for a single set of stator vanes increases the operability of the stator vanes. In embodiments with 2 or more electric actuators coupled to a single stage of vanes, it may be desirable for the actuators and their associated equipment (e.g., motors and motor controllers) to be in communication with one another to improve the operability of the compressor vanes.

Turning now to the figures, FIG. 1 illustrates a block diagram of an embodiment of a gas turbine system 10 having a compressor 56 equipped with vanes 14 that may be adjusted by an actuation system 16. Throughout the discussion, a set of axes will be referenced. These axes are based on a cylindrical coordinate system and point in an axial direction 18, a radial direction 20, and a circumferential direction 22. For example, the axial direction 18 extends along a longitudinal axis 24 of the gas turbine system 10, the radial direction 20 extends away from the longitudinal axis 24, and the circumferential direction 22 extends around the longitudinal axis 24. Furthermore, it should be noted that a variety of rotary equipment, such as compressors, turbines, pumps, and/or the like, may benefit from the adjustable vanes 14 and the actuation system 16.

As shown, the compressor 56 includes multiple stages of the vanes 14 disposed at various positions along the compressor 56 in the axial direction 18. More specifically, the compressor 56 includes inlet guide vanes (IGVs) 26 (e.g., 14) positioned at an inlet 28 of the compressor 56, variable stator vanes (VSVs) 30 (e.g., 14) disposed between the inlet 28 and an outlet 32 of the compressor 56, and rotor blades 58 disposed between the IGVs 26 and the VSVs 30. In general, the rotor blades 58 are coupled to a rotor (e.g., shaft 36) of the compressor 56, and rotate about the longitudinal axis 24 in the circumferential direction 22 during operation of the compressor 56. On the other hand, IGVs 26 and VSVs 30 are coupled to stator (e.g., stationary) components of the compressor 56, and generally do not rotate about the longitudinal axis 24.

As illustrated, the actuator system 16 is coupled to each of the IGVs 26 and the VSVs 30. However, in certain embodiments, the actuation system 16 may be coupled to only a portion of the IGVs 26 and VSVs 30. In other words, a portion of the compressor vanes 14 may have a fixed pitch or angle, whereas another portion of the compressor vanes 14 may have an adjustable pitch that is controlled by the actuation system 16. As will be described in further detail below, the actuation system 16 includes a first actuator 38 coupled to the IGVs 26, a first motor 40 (e.g., electric motor) that may drive the first actuator 38, and a controller 42 (e.g., motor controller) that provides signals that control operation of the first motor 40. In a similar manner, a second actuator 44 controls each of the VSVs 30. For example, the second actuator 44 may adjust a torque tube 46 (e.g., a structure that transmits radial forces along the axial direction 18) that, in turn, adjusts each of the VSVs 30. A second motor 48 may drive the second actuator 44, and controller 50 governs operation of the second motor 48.

During operation of the gas turbine system 10, it may be desirable to adjust the pitch of the IGVs 26 and the VSVs 30. For example, a lower pitch of the IGVs 26 and the VSVs 30 may be more desirable during start-up operation, when flow rates and pressures are generally lower. In other words, a lower pitch at the IGVs 26 and the VSVs 30 may provide less resistance to flow as the IGVs 26 and the VSVs 30 are generally not aligned with the longitudinal axis 24. In addition, adjusting the IGVs 26 and VSVs 30 may counteract pressure and flow fluctuations that occur within the compressor 56. The IGVs 26 and VSVs 30 increases the operability of the compressor 56 and the gas turbine system 10. Operation of the gas turbine system 10 is summarized below.

An oxidant 52 flows from an intake 54 into the compressor 56, where the rotation of the compressor blades 58 compresses and pressurizes the oxidant 52. The oxidant 52 may include ambient air, pure oxygen, oxygen-enriched air, oxygen-reduced air, oxygen-nitrogen mixtures, or any suitable oxidant that facilitates combustion of fuel. The following discussion refers to air 52 as an example of the oxidant, but is intended only as a non-limiting example. The air 52 flows into a fuel nozzle 60. Within the fuel nozzle 60, fuel 62 mixes with the air 52 at a ratio suitable for combustion, emissions, fuel consumption, power output, and the like. Thereafter, a mixture of the fuel 62 and the air 52 is combusted into hot combustion products 64 within a combustor 66. The hot combustion products 64 enter the turbine 12 and force rotor blades 34 to rotate, thereby driving the shaft 36 into rotation. The rotating shaft 36 provides the energy for the compressor 56 to compress the air 52. More specifically, the rotating shaft 52 rotates the compressor blades 58 attached to the shaft 36 within the compressor 56, thereby pressurizing the air 52 that is fed to the combustor 66. Furthermore, the rotating shaft 36 may drive a load 68, such as an electrical generator or any other device capable of utilizing the mechanical energy of the shaft 36. After the turbine 12 extracts useful work from the combustion products 64, the combustion products 64 are discharged to an exhaust 70.

Figure 2:
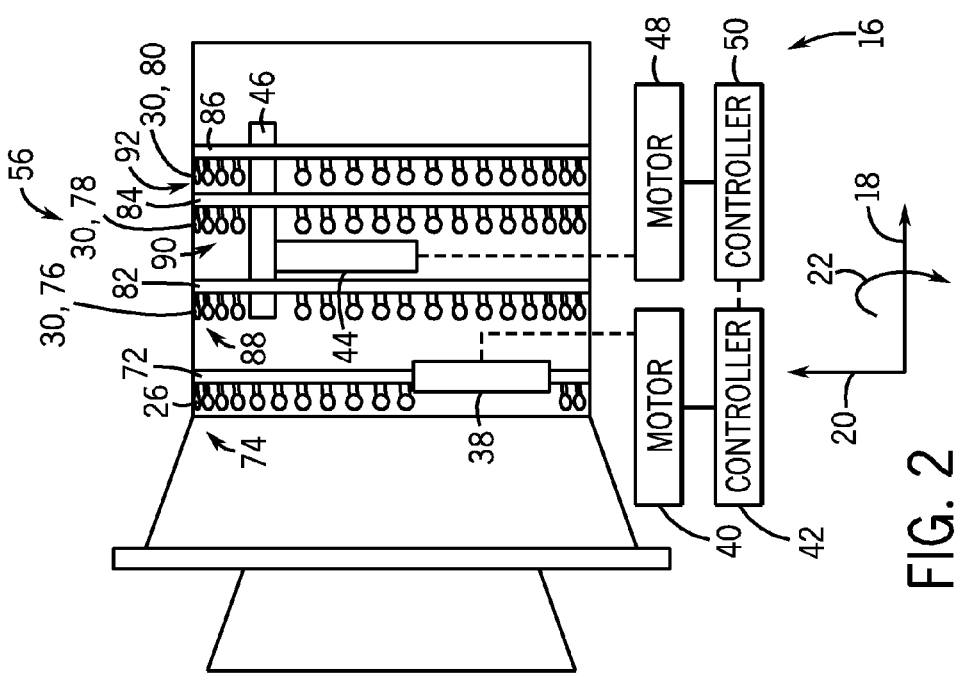
FIG. 2 is a partial cross-sectional view of an embodiment of the compressor of FIG. 1, illustrating inlet guide vanes (IGVs) and multiple sets of variable stator vanes (VSVs) adjusted by the one or more electric actuators.

FIG. 2 illustrates a partial cross-sectional view of an embodiment of the compressor 56, showing the IGVs 26 and the VSVs 30 in greater detail. Again, it should be noted that the adjustable vanes 14 may be applied to a variety of rotating equipment, such as the compressor 56, the turbine 12, or any combination thereof. As shown, the IGVs 26 are coupled to a first unison ring 72 and are positioned with a first pitch 74. The actuator 38 may move the first unison ring 72 (e.g., in the radial 20 or circumferential 22 direction), thereby moving each of the IGVs 26 in the radial 20 or circumferential 22 direction. In certain embodiments, each of the IGVs 26 may be positioned at a substantially similar pitch. In a similar manner, first, second, and third stages 76, 78, and 80 of the VSVs 30 are coupled to respective unison rings 82, 84, and 86. The actuator 44 may move the torque tube 46 (e.g., in the radial 20 or circumferential 22 direction) in order to adjust each of the unison rings 82, 84, and 86 in the radial 20 or circumferential 22 direction, thereby adjusting respective pitches 88, 90, and 92 (e.g., a first stator pitch 88, a second stator pitch 90, or a third stator pitch 92) of the VSV stages 76, 78, and 80. As noted earlier, the compressor 56 may include any suitable number of VSV stages. For example, the compressor may be a single-stage compressor having a single VSV stage, a dual-stage compressor having two VSV stages, or a multi-stage compressor having 3, 4, 5, or more VSV stages.

Because the pitches 88, 90, and 92 of the VSVs 30 are adjusted collectively by the position of the torque tube 46, it may be desirable for the pitches 88, 90, and 92 to move in a predetermined ratio relative to one another. That is, a certain position of the torque tube 46 may correspond to specific pitches of the VSVs 30, and adjustment of an individual VSV pitch may affect the other VSV pitches. For example, the pitches 88 and 90 may have a constant ratio relative to one another while the torque tube 46 is adjusted. While the pitches 88 and 90 may change, their ratio may remain approximately constant during operation of the gas turbine system 10. Such a configuration enables relatively predictable operation of the gas turbine system 10. It should be noted, however, that certain embodiments may employ additional actuators to enable each of the VSV pitches 88, 90, and 92 to be adjusted independently of one another.

As shown, the IGVs 26 are adjusted by the first actuator 38 (e.g., via radial 20 or circumferential 22 movement of the first unison ring 72), whereas the VSVs 30 are collectively adjusted by the second actuator 44 (e.g., via radial 20 or circumferential 22 movement the torque tube 46). This configuration enables the first pitch 74 of the IGVs 26 to be controlled separately and independently of the VSV pitches 88, 90, and 92. For example, during start-up operation, it may be desirable to adjust the first pitch 74 of the IGVs 26 to throttle flow of the air 52 while maintaining the VSV pitches 88, 90, and 92 approximately constant. On the other hand, during steady-state or full-load operation, it may be desirable to adjust the VSV pitches 88, 90, and 92, while maintaining the first pitch 74 of the IGVs 26 approximately constant to control the outlet pressure or pressure ratio of the compressor 56. Thus, in certain configurations, the IGVs 26 may have a greater influence on the flow rate of the air 52 through the compressor 56, while the VSVs 30 may have a greater influence on the pressure profile within the compressor 56. Simultaneously controlling the IGVs 26 and VSVs 30 may enable a targeted flow and pressure profile within the compressor 56.

Figure 3:
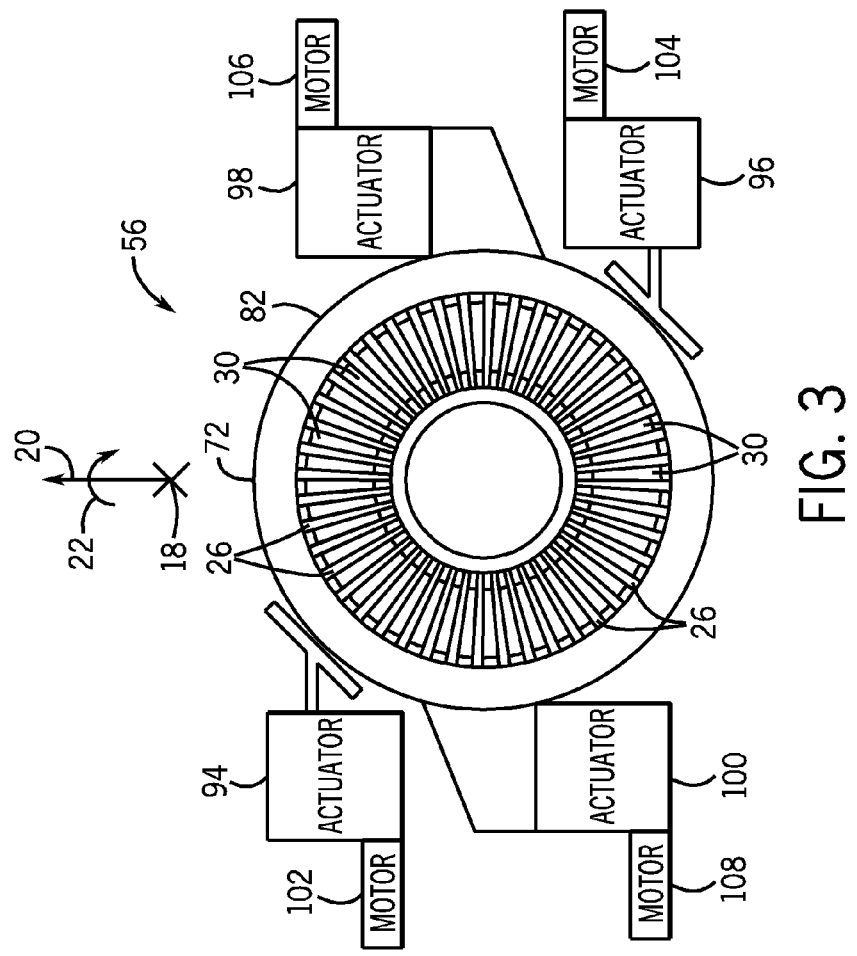
FIG. 3 is front view of an embodiment of the compressor of FIG. 1, illustrating multiple actuators adjusting a single set of compressor vanes in coordination with one another.

Although the embodiments illustrated in FIGS. 1 and 2 show a single actuator (e.g., 38 or 44) coupled to each unison ring (e.g., 72, 82, 84, and 86), multiple actuators may be coupled to each unison ring to improve the stability and operability of the unison rings. In general, 1, 2, 3, 4, or more actuators may be coupled directly or indirectly (e.g., through the torque tube 46) to each unison ring. As shown in FIG. 3, the unison rings may be coupled to two or more actuators spaced circumferentially 22 about the compressor 56.

FIG. 3 illustrates a front view of an embodiment of the compressor 56 including multiple IGV actuators 94 and 96 (e.g., 38) coupled to the unison ring 72 of the IGVs 26 and multiple VSV actuators 98 and 100 (e.g., 44) coupled to the unison ring 82 of the VSVs 30. The IGV actuators 94 and 96 are driven by respective motors 102 and 104 (e.g., 40), whereas the VSV actuators 98 and 100 are driven by motors 106 and 108 (e.g., 48). Each set of actuators (e.g., 94 and 96, 98 and 100) is spaced circumferentially 22 about the longitudinal axis 24 of the compressor 56, which enables a relatively uniform movement of the unison rings 72 and 82. It should be noted that other arrangements of the actuators 94, 96, 98, and 100, may be envisioned, depending on the physical or spatial limitations of the compressor 56. Furthermore, in embodiments with more than one actuator, it may be desirable for the multiple actuators and/or associated components (e.g., controller or motor) to be in communication with each other, thereby improving the operability of the actuation system 16, as discussed below with respect to FIG. 4.

Figure 4:
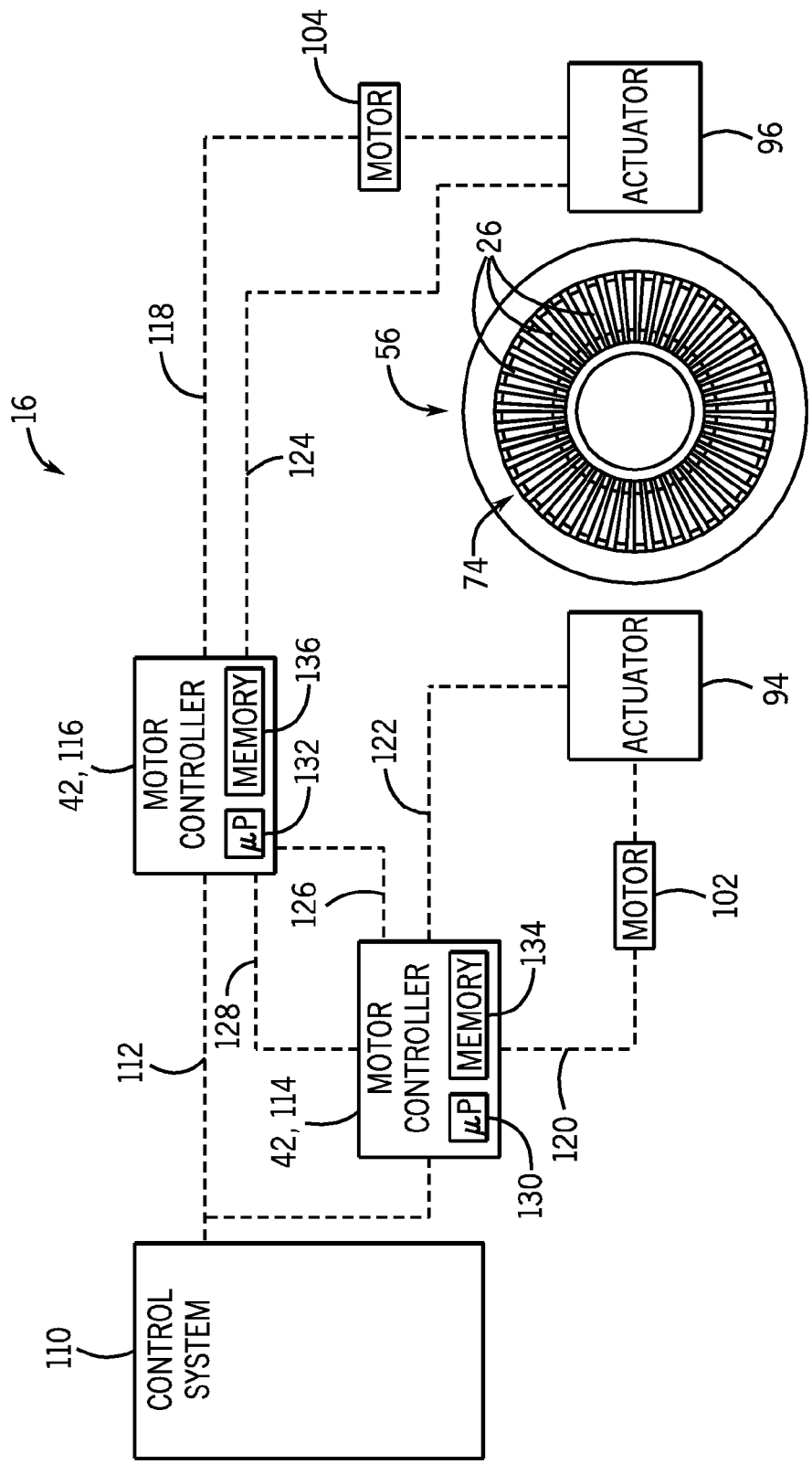
FIG. 4 is a schematic diagram of an embodiment of the actuation system of FIG. 1, illustrating a digital communication link enabling communication between multiple motor controllers.

FIG. 4 illustrates an embodiment of the actuation system 16 equipped with the multiple IGV actuators 94 and 96 coupled to the single unison ring 72. Although the discussion is directed towards the IGVs 26, it should be noted that the disclosed techniques may also be applied to the VSVs 30 or any other vanes 14 with a variable pitch. In other words, the ensuing discussion is generic to the vanes 14 and may be applied to the IGVs 26, the VSVs 30, or any combination thereof.

As shown, a control system 110 (e.g., distributed control system) transmits an input signal 112 to motor controllers 114 and 116 (e.g., 42). The signal may be indicative of a desired pitch of the IGVs 26, which, in turn, may be based on the current operating conditions (e.g., pressure or flow rate) of the gas turbine system 10. As noted earlier, the pitch of the IGVs 26 may affect the pressure and/or flow rate of the air 52 flowing through the compressor 56. Accordingly, it may be desirable to adjust the pitch 74 of the IGVs 26 based on these operating conditions.

The motor controllers 114 and 116 transmit output signals 118 and 120 to the respective motors 102 and 104. The output signals 118 and 120 may control the speed, torque, or other operating conditions associated with the motors 102 and 104. Although the motor controllers 114 and 116 and the motors 102 and 104 are illustrated as separate elements, in certain embodiments, the motor controllers 114 and 116 may be included as motor drives within the respective motors 102 and 104. That is, the motor controllers 114 and 116 may be internal components of the motors 102 and 104.

As explained previously, operation of the motors 102 and 104 drives the actuators 94 and 96, thereby adjusting the IGVs 26. The output signals 118 and 120 transmitted by the motor controllers 114 and 116 may be based on the input signal 112 and/or positional feedback from the actuators 94 and 96 via feedback lines 122 and 124. That is, the output signals 118 and 120 may be based on the desired IGV position as well as the current IGV position. Furthermore, the output signals 118 and 120 may be coordinated with each other. Because both actuators 94 and 96 jointly move the unison ring 72, it may be desirable for each motor controller 112 and 114 to be informed of the actions and signals transmitted by the other controller. In other words, the output signal 118 may be based on the output signal 120, and vice versa. To this end, the motor controllers 114 and 116 are communicatively coupled to each other via serial links 126 and 128. The serial links 126 and 128 may include, for example, a wired connection, a wireless connection, or both. The serial links 126 and 128 enable controlled adjustment of the IGVs 26 by enabling communication between the motor controllers 114 and 116.

As shown, each of the motor controllers 114 and 116 includes respective processors 130 and 132 and memory 134 and 136 to execute instructions to control the corresponding motors and actuators in order to adjust the IGVs 26. For example, the processors 130 and 132 may include general-purpose or application-specific microprocessors. In some embodiments, the motor controllers 114 and 116 may include an application-specific or general purpose computer. The instructions (e.g., software or hardware instructions) may be encoded in software programs that may be executed by the processor 130 and 132. Further, the instructions may be stored in a tangible, non-transitory, computer-readable medium, such as the memory 134 and 136. The memory 134 and 136 may include, for example, random-access memory, read-only memory, hard drives, and/or the like. The motor controllers 114 and 116 may interact with the motors 102 and 104, the actuators 94 and 96, and the control system 110 in order to improve the operability of the gas turbine system 10.

By way of example, shutdown instructions for the gas turbine system 10 may be stored within the memory 134 and 136. If communication between the control system 110 and the motor controllers 114 and 116 is interrupted, or the gas turbine system 10 enters a shutdown mode for any other reason, it may be desirable to gradually adjust the IGVs 26 to a suitable pitch for shutdown. The motor controllers 114 and 116 may transmit predetermined signals to the motors 102 and 104 based on the instructions stored within the memory 134 and 136. However, the serial links 126 and 128, which are external of the control system 110, enable the motor controllers 114 and 116 to remain in communication with one another, even when communication with the control system 110 is interrupted. Thus, the output signals 118 and 120 may be based on the positional feedback 122 and 124, as well as the instructions stored within the memory 134 and 136. Such a configuration reduces the possibility that the motors 102 and 104 and the actuators 94 and 96 are out of sync with one another, thereby improving the operability of the gas turbine system 10. It should be appreciated that the memory 134 and 136 may store predetermined instructions for a wide range of operating modes, including start-up, standby, shutdown, partial-load, full-load, transient, steady-state, or any other suitable operating mode.

Figure 5:
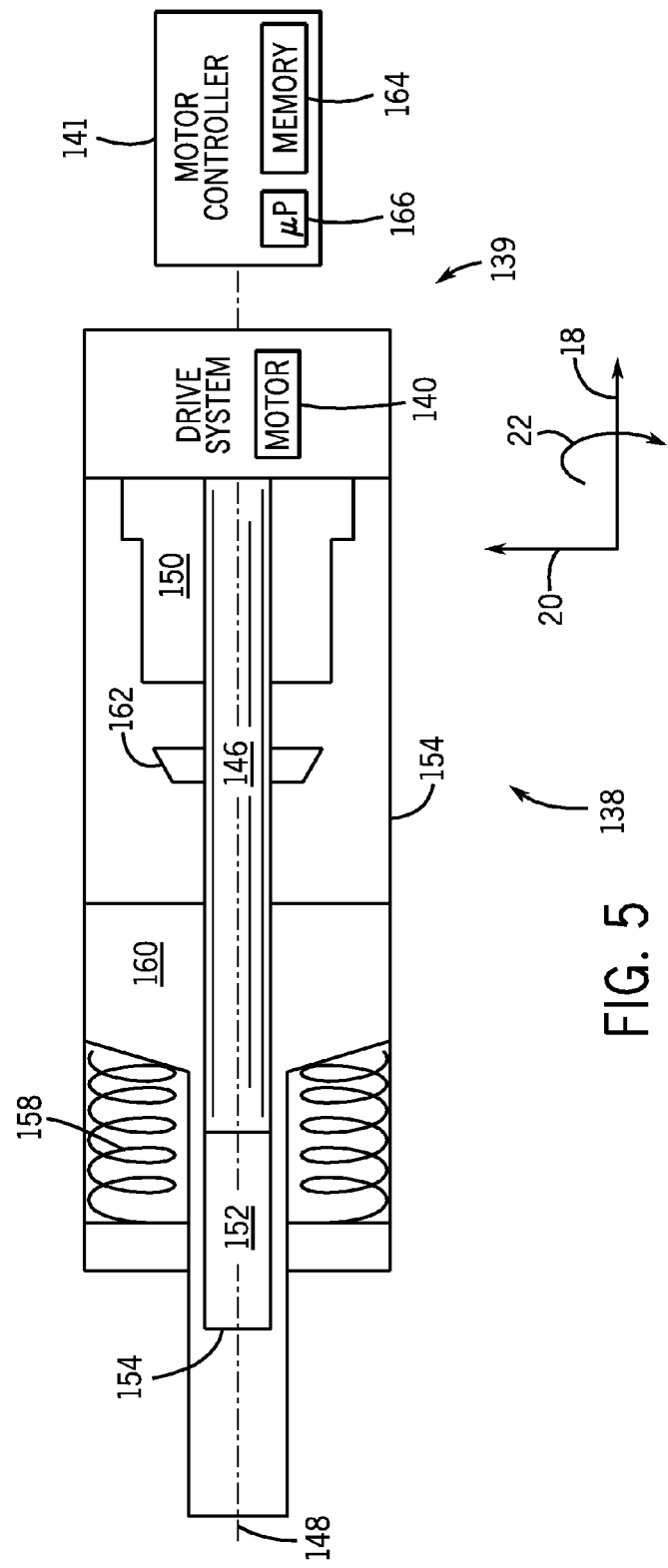
FIG. 5 is a cross-sectional view of an embodiment of the actuator of FIG. 1 equipped with features to improve the operability of the actuation system.

FIG. 5 illustrates a cross-sectional view of an embodiment of an actuator 138 (e.g., 38 or 44) that may be used to actuate the IGVs 26, the VSVs 30, or both. As shown, a drive system 139 is coupled directly to the actuator 138. The drive system may include a motor 140 (e.g., 40 or 48) as well as a system of gears, belts, drive shafts, and the like in order to actuate the IGVs 26 and the VSVs 30. An external motor controller 141 (e.g., 42 or 50) is communicatively coupled to the motor 140. Operation of the motor 140 drives a shaft 146 of the actuator 138 into rotation. Rotation of the shaft 146 results in movement of the shaft 146 along the axial direction 18. Movement of the shaft 146 adjusts the unison rings, and subsequently, the pitch of the blades 14. The shaft 146 defines an axis 148 of the actuator 138. Within FIG. 5, the terms axial 18, radial 20, and circumferential 22 are relative to the axis 148. That is, the axial 18 direction is taken along the axis 148, the radial 20 direction points away from the axis 148, and the circumferential 22 direction travels around the axis 148.

As shown, a support bearing 150 is coupled circumferentially 22 about the shaft 146. The support bearing 150 supports axial 18 loading of the shaft 146. The shaft 146 is disposed within a passage 152 of an actuator housing 154. The passage 152 generally defines axial 18 movement limits (e.g., a physical stop or limitation) of the shaft 146. That is, the shaft 146 is substantially constrained between opposite axial ends 154 and 156 of the passage 152. These movement limits 154 and 156 may correspond to an acceptable range of pitches for the IGVs 26, the VSVs 30, or both. Furthermore, the ranges may vary depending based on the type of vane 14. For example, the opposite axial ends 154 and 156 may correspond to a pitch range of approximately 0 to 50, 10 to 40, or 20 to 30 degrees for the IGVs 26 or to a pitch range of approximately 20 to 40, 10 to 50, or 0 to 60 degrees for the VSVs 30. In certain embodiments, it may be desirable for the IGVs 26 to entirely close to block flow, while not entirely closing the VSVs. In summary, the pitch range, as well as a length of the shaft 146, a length of the passage 152, or any combination thereof, may be designed based on the type of compressor vane 14 adjusted by the actuator 138.

The actuator 138 may also include a spring 158 supported by a spring support 160. Furthermore, one or more washers 162 (e.g., Belleville washers) having frusto-conical shapes are disposed circumferentially about the shaft 146. Movement of the shaft 146 may result in contact between the washer 162 and the spring support 160. When the one or more washers 162 contacts the spring support 160, additional axial 18 movement of the shaft 146 is dampened by the spring 158. That is, the spring 158 slows axial 18 movement of the shaft 146 as the shaft 146 approaches the end 154 of the passage 152. Such a configuration reduces the possibility of over-rotation or over-extension of the shaft 146. Thus, the spring 158, spring support 160, and washer 162 may define an additional physical stop or limitation for axial 18 movement of the shaft 146.

Although a single washer 162 is illustrated, any number and/or configuration or washers may be used. For example, the actuator 138 may exclude the spring 158, the spring support 160, and the washer 162. Alternatively, the actuator may include 1, 2, 3, 4 or more washers 162. It should be appreciated that multiple washers coupled together axially 18 may behave as a spring. The orientation of the washers 162 (e.g., stacking in the same or alternating direction) may be adjusted in order to adjust a spring constant of the multiple washers 162. Furthermore, the desired spring constant of the washers 162 may be based on the spring constant of the spring 158. For example, it may be desirable for the multiple washers 162 to be stiffer than the spring 158 in order to improve the operability of the actuator 138.

Software stops may be used independently or in conjunction with the physical stops described above. For example, a software stop encoded within memory 164 and implemented by a processor 166 of the motor controller 141 may reduce rotation of the rotor 142 when certain thresholds are reached. For example, the motor controller 141 may cease to rotate the rotor 142 when a pitch of the vanes 14, a position of the shaft 146, a temperature, pressure, or flow rate within the gas turbine system 10, or another operating condition, or any combination thereof, reaches one or more thresholds (e.g., is outside an acceptable range). As will be appreciated, the operating condition may be detected as a percentage of a span of a sensor (e.g., 0 to 100 percent), and the software stops may be based on the span. For example, a software stop may exist at or below approximately 30% of the span, and/or above approximately 70% of the span. These software stops may be implemented based on a variety of operating conditions and modes of the gas turbine system 10. For example, a software stop on the IGV pitch 74 may be different when the gas turbine system 10 is operating in a start-up mode as compared to a steady-state mode. Furthermore, certain embodiments may include bypasses for the software stops described above.

Technical effects of the disclosed embodiments include systems and control of the compressor vanes 14 within the gas turbine system 10. During operation of the compressor 56, the pitch of the IGVs 26, the VSVs 30, or both, are adjusted in order to control certain operating conditions of the compressor 56 (e.g., flow rate or pressure drop). The desired pitch of the vanes 14 may vary depending on an operating mode of the compressor 56 (e.g., start-up, transient, steady-state, partial-load, or full-load). The pitch of the compressor vanes 14 is adjusted by the actuators 38 and 44 driven by the motors 40 and 48, which, in turn, are controlled by the motor controllers 42 and 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine system, comprising:
    a compressor, comprising:
        a plurality of inlet guide vanes disposed at an inlet of the compressor; and
        at least one unison ring, wherein each unison ring is coupled to a plurality of variable stator vanes disposed between the inlet and an outlet of the compressor;
    a first actuator configured to adjust a first pitch of the plurality of inlet guide vanes;
    a second actuator configured to adjust a second pitch of the plurality of variable stator vanes;
    a first electric motor configured to drive the first actuator in response to control by a first motor controller; and
    a second electric motor configured to drive the second actuator in response to control by a second motor controller, wherein the first and second motor controllers are respectively configured to control the first and second actuators independently in coordination with one another based on a first position feedback from the first actuator and a second position feedback from the second actuator, and wherein the first and second motor controllers are configured to control the first and second actuators independently in coordination with one another to help achieve a targeted flow and pressure profile in the compressor;
    wherein each of the first and second actuators comprises:
        a housing;
        a shaft disposed within a passage of the housing, wherein the passage is configured to axially constrain movement of the shaft;
        at least one frusto-conical washer disposed around the shaft; and
        a spring coupled to a spring support and configured to resist axial movement of the shaft when the at least one frusto-conical washer contacts the spring support.

2. The gas turbine system of claim 1, wherein the at least one unison ring comprises first and second unison rings coupled together by a torque tube.

3. The gas turbine system of claim 2, wherein the first unison ring is coupled to a first plurality of variable stator vanes disposed at a first stator pitch, the second unison ring is coupled to a second plurality of variable stator vanes disposed at a second stator pitch, and the second actuator is configured to adjust the first and second stator pitches by adjusting the torque tube.

4. The gas turbine system of claim 3, wherein the first and second stator pitches are configured to move in a predetermined ratio relative to one another when the second actuator adjusts the torque tube.

5. The gas turbine system of claim 4, wherein the predetermined ratio is approximately constant.

6. The gas turbine system of claim 1, wherein the first and second motor controllers are respectively configured to control the first and second actuators dependent on an operating mode of the gas turbine system, and the operating mode comprises a startup mode or a steady state mode.

7. The gas turbine system of claim 1, wherein the first and second motor controllers are respectively configured to control the first actuator in a manner dependent on control of the second actuator, or control the second actuator in a manner dependent on control of the first actuator.

8. A gas turbine system, comprising:
    a compressor having a plurality of vanes disposed circumferentially about an axis of the compressor;
    a first actuator configured to adjust a pitch of the plurality of vanes;
    a second actuator configured to adjust the pitch of the plurality of vanes;
    a first electric motor configured to drive the first actuator;
    a second electric motor configured to drive the second actuator; and
    a control system comprising the first and second electric motors, wherein the control system is configured to control the first and second actuators independently in coordination with one another via first and second motor controllers, respectively, and wherein the control system is configured to control the first and second actuators based on a first position feedback from the first actuator and a second position feedback from the second actuator, and wherein the control system is configured to control the first and second actuators independently in coordination with one another, via the first and second motor controllers, to help achieve a targeted flow and pressure profile in the compressor;
    wherein each of the first and second actuators comprises:
        a housing;
        a shaft disposed within a passage of the housing, wherein the passage defines a first physical stop configured to axially constrain movement of the shaft;
        at least one frusto-conical washer disposed around the shaft; and
        a spring coupled to a spring support defining a second physical stop configured to axially constrain movement of the shaft when the at least one frusto-conical washer contacts the spring support.

9. The gas turbine system of claim 8, wherein the control system is configured to transmit an input signal to the first motor controller coupled to the first electric motor and the second motor controller coupled to the second electric motor, wherein the input signal is based on a desired pitch of the plurality of vanes.

10. The gas turbine system of claim 9, wherein the first and second motor controllers are communicatively coupled to each other through first and second serial links.

11. The gas turbine system of claim 8, wherein the control system comprises the first motor controller configured to receive the first position feedback from the first actuator and the second motor controller configured to receive the second position feedback from the second actuator, and the control system is configured to coordinate control of the first and second electric motors based on the first and second position feedback.

12. The gas turbine system of claim 11, wherein the first motor controller is configured to receive the second position feedback from the second motor controller, and wherein the first motor controller is configured to send a first motor signal to the first motor based on an input signal, the first position feedback, and the second position feedback.

13. The gas turbine system of claim 12, wherein the first and second motor controllers are configured to adjust the pitch of the plurality of vanes based on a predetermined shutdown sequence when communication between the control system and the first or second motor controllers is interrupted.

14. The gas turbine system of claim 8, wherein the plurality of vanes comprises a first plurality of inlet guide vanes, a second plurality of variable stator vanes, or both.

15. The gas turbine system of claim 8, wherein the first and second motor controllers are respectively configured to control the first actuator in a manner dependent on control of the second actuator, or control the second actuator in a manner dependent on control of the first actuator.

16. An actuator system, comprising:
an electric motor;
an actuator configured to be driven by the electric motor; wherein the actuator comprises:
   a housing;
   a shaft disposed within a passage of the housing, wherein the passage defines a first physical stop configured to constrain axial movement of the shaft;
   at least one frusto-conical washer disposed around the shaft; and
   a spring coupled to a spring support defining a second physical stop configured to constrain axial movement of the shaft when the at least one frusto-conical washer contacts the spring support; and
a controller comprising memory and a processor configured to execute instructions to control the electric motor based on sensor feedback relating to operation of a compressor.

17. The actuator system of claim 16, wherein the instructions comprise a software stop configured constrain axial movement of the shaft within a range of movement.

18. The actuator system of claim 17, wherein the range of movement is less than a length of the passage.

19. The actuator system of claim 16, wherein the at least one frusto-conical washer comprises a plurality of frusto-conical washers, and wherein the orientation of the plurality of frusto-conical washers is based on a spring constant of the spring.

\* \* \* \* \*